(12) United States Patent
Yang et al.

(10) Patent No.: US 11,479,182 B1
(45) Date of Patent: Oct. 25, 2022

(54) BICYCLE RACK SUPPORT DEVICE (71) Applicant: Guangzhou issyzone Technology Co., Ltd, Guangzhou (CN)

(72) Inventors: Taiping Yang, Guangzhou (CN); Jia Zhuo, Guangzhou (CN)

( * ) Notice: Subject to any disclaimer, the term of this patent is extended or adjusted under 35 U.S.C. 154(b) by 0 days.

(21) Appl. No.: 17/585,621

(22) Filed: Jan. 27, 2022

(51) Int. Cl.
*B60R 9/10* (2006.01)

(52) U.S. Cl.
CPC ...................... *B60R 9/10* (2013.01)

(58) Field of Classification Search
CPC .......... B60R 9/10; B60R 9/06; Y10S 224/924
See application file for complete search history.

(56) References Cited

U.S. PATENT DOCUMENTS

| | | | | |
|---|---|---|---|---|
| 5,775,560 A * | 7/1998 | Zahn | ........................ | B60R 9/06 224/524 |
| 6,745,926 B2 * | 6/2004 | Chimenti | .................. | B60R 9/06 224/924 |
| 7,055,725 B1 * | 6/2006 | Kolda | ....................... | B60R 9/10 224/924 |
| 8,066,162 B2 * | 11/2011 | Chiang | ..................... | B60R 9/10 224/497 |
| 9,376,063 B2 * | 6/2016 | Hein | ......................... | B60R 9/06 |
| 9,694,758 B1 * | 7/2017 | Krolski | ..................... | B60P 1/28 |
| 10,293,757 B2 * | 5/2019 | Bass | .......................... | B60R 9/10 |
| 10,688,940 B2 * | 6/2020 | Settelmayer | .............. | B60R 9/10 |
| 2005/0082329 A1 * | 4/2005 | Cohen | ....................... | B60R 9/10 224/924 |
| 2011/0057008 A1 * | 3/2011 | Clausen | ................... | B60R 9/10 224/504 |
| 2013/0264367 A1 * | 10/2013 | Hill | .......................... | B60R 9/10 224/505 |
| 2014/0246467 A1 * | 9/2014 | Hein | ........................ | B60R 9/06 224/400 |

* cited by examiner

*Primary Examiner* — Brian D Nash
(74) *Attorney, Agent, or Firm* — Rumit Ranjit Kanakia (57) ABSTRACT

A bicycle rack support device for a vehicle to attach a bicycle rack for carrying a bicycle by the vehicle is provided. The bicycle rack support device includes a bracket, a collapsible latch assembly having a first engagement member and a second engagement member, a horizontal support bar, and a vertical support bar. The first engagement member is operatively engaged along the bottom portion of the bracket and coupled to the horizontal support bar. The second engagement member is operatively engaged along the top portion of the bracket and coupled with the vertical support bar. The vertical support bar is pivoted and may move towards rearward from the partially back opened recess away from the horizontal support bar to be angularly adjusted. The vertical support bar is further pivoted forward towards the horizontal support bar to be locked on the horizontal support bar.

14 Claims, 11 Drawing Sheets

BICYCLE RACK SUPPORT DEVICE

FIELD OF THE DISCLOSURE

The present disclosure relates to bicycle carriers, and, more particularly, to a bicycle rack support device for a vehicle to attach a bicycle rack for carrying a bicycle by the vehicle.

BACKGROUND OF THE DISCLOSURE

With increasing global awareness of the health-related issue, most of the individual are now adapting one ore more health related activities to sweat out and keep themselves healthy and fit. Among various health activates, riding bicycles is among one of most popular one as it is very health improving and maintaining activity. To make bicycle ride more pleasant and enjoyable, people often take their bicycles to interesting spots, such as on vacation by carrying the bicycle on their vehicles, such as personal cars, via bicycle racks.

One of the conventional bicycle racks are connected to a rear end of the vehicle and generally includes a connection end which is connected with a hitch located rear side and beneath a bump of the vehicle. Such conventional bicycle racks also include an L-shaped post having a plurality of securing members for securing bicycle frames thereto. Another conventional bicycle rack uses hooks and belts to hook the bicycle rack on the hatch back of the vehicle. Two support arms extend from the rack so as to support the bicycle thereon. Fastening members are used to fasten the bicycle on the support arms.

Both of the conventional bicycle racks may carry multiple bicycles, however, neither of the conventional bicycle racks provide convenience of opening tail gates of vehicles while the bicycle racks are coupled to the vehicles. Further, while the conventional bicycle racks are assembled to the hitch of the vehicles, there are probability of being stolen when not is use and therefore required to be removed and coupled when in use or not in use.

Accordingly, there exists a need to overcome shortcomings of the conventional bicycle racks. For example, there exists a need of such a bicycle rack which may provide convenience of opening tail gates of vehicles while the bicycle racks are coupled to the vehicles. Further, there is need of such a bicycle rack which may protect from theft. Further, there is need of such a bicycle rack which may be easy to assemble and disassemble with the hitch of the vehicle.

SUMMARY OF THE DISCLOSURE

In view of the foregoing disadvantages inherent in the prior art, the general purpose of the present disclosure is to provide a bicycle rack support device, to include all advantages of the prior art, and to overcome the drawbacks inherent in the prior art.

An object of the present disclosure is to provide a bicycle rack which may provide convenience of opening tail gates of vehicles while the bicycle racks are coupled to the vehicles.

An object of the present disclosure is to provide such a bicycle rack which may be protected from theft.

Another object of the present disclosure is to provide such a bicycle rack which may be easy to assemble and disassemble with the hitch of the vehicle.

In light of the above objects, in one aspect of the present disclosure, a bicycle rack support device for a vehicle to attach a bicycle rack for carrying a bicycle by the vehicle is provided. The bicycle rack support device includes a bracket, a collapsible latch assembly having a first engagement member and a second engagement member, a horizontal support bar, and a vertical support bar. The bracket includes two side plates and a back plate coupled together to form a front opened recess extending across the bracket, and a partially back opened recess extending along a top portion aligned above a bottom portion of the bracket. The two side plates may include a circular tapered projection, and a pair of fixing slots along the top portion. Further, the first engagement member of the collapsible latch assembly is operatively engaged along the bottom portion of the bracket. The second engagement member of the collapsible latch assembly is operatively engaged along the top portion of the bracket. Furthermore, the horizontal support bar is detachably coupled to the bracket along the bottom portion. The horizontal support bar is engaged with the first engagement member. The horizontal support bar is adapted to be engaged with a hitch located beneath a bump of the vehicle via the first engagement member. Moreover, the vertical support bar is pivotally coupled to the bracket along the top portion above the horizontal support bar. The vertical support bar is adapted to engage the bicycle rack. The vertical support bar is operatively coupled with the second engagement member to be engaged with the pair of fixing slots to be fixed vertically, thereby vertically align the bicycle rack. The vertical support bar is further pivoted along the circular tapered projection of the bracket towards rearward from the partially back opened recess away from the horizontal support bar to angularly adjust the bicycle rack with respect to the vehicle.

In one embodiment of the present disclosure, each of the two side plates along the top portion of the bracket includes a tapered part to define the circular tapered projection along the top portion. The back opened recess may extend towards the circular tapered projection.

In one embodiment of the present disclosure, the first engagement member is operatively engaged along the bottom portion of the bracket and disposed within the horizontal support bar which is hollow. The first engagement member includes an engageable attachment and a lock handle. The engageable attachment is disposed in the horizontal support bar and extends to couple with the back plate along the bottom portion via an attaching piece. Further, the lock handle is coupled to the attaching piece to actuate the engageable attachment.

In one embodiment of the present disclosure, the engageable attachment includes a hitch attaching member aligned across a free end portion of the horizontal support bar. The hitch attaching member is adapted to be attached with the hitch of the vehicle, thereby attaching the bicycle rack support device with the vehicle.

In one embodiment of the present disclosure, the second engagement member is operatively engaged along the top portion of the bracket and disposed within the vertical support bar, which is hollow. The second engagement member includes a pivotal attachment and a gear-driven pin lock assembly. The pivotal attachment includes a pivoting pin on the vertical support bar, and pivoting slots on the two side plates to receive the pivotal attachment to be pivot therealong. The pivotal attachment further includes a gear-driven pin lock assembly operatively disposed in the vertical support bar and operatively coupled to the pivotal attachment to adjust the pivoting pin to pivot the vertical support bar to angularly adjust the bicycle rack with respect to the vehicle.

In one embodiment of the present disclosure, the gear-driven pin lock assembly includes a U-shaped slide block having a plurality of teeth receiving slots on one side, a first recess on a top side, and a first pin-receiving slots extending through both sides. The gear-driven pin lock assembly further includes a pair of second recess, a second pin-receiving slots, a locking cum adjusting pin, a gear wheel, a pin member and a biasing member. The pair of second recess is configured on the vertical support bar. Further, the second pin-receiving slots is vertically extending along two sides of the vertical support bar. The gear wheel is engaged with the first recess and the pair of second recess and extends through the U-shaped slide block to protrude outward from the vertical support bar to receive the locking cum adjusting pin. The gear wheel includes a plurality of teeth to be rotatingly engaged with the plurality of teeth receiving slots. Furthermore, the pin member is received in the first and second pin-receiving slots to be operatively slid up and down in the second pin-receiving slots to be slid on the circular tapered projection, when the gear wheel is adjusted with the locking cum adjusting pin. The biasing member is coupled to the pin member and the pivoting pin of the pivotal attachment to adjust the pivoting pin based on rotation of the gear wheel to slid the pin member on the circular tapered projection to angularly adjust the bicycle rack with respect to the vehicle.

In one embodiment of the present disclosure, the bicycle rack support device further includes a bicycle rack engaging portion formed along a free end portion of the vertical support bar.

In one another embodiment, another type of the first engagement member is provided. Such first engagement member is operatively engaged along the bottom portion of the bracket and disposed within the horizontal support bar which is hollow and includes a side recess and a top recess. The first engagement member includes a block member and a lock handle. The block member is disposed within the hollow horizontal support bar to be engaged with the side and top recesses. The block member includes a fixed block, and a movable block slidingly engaged with the fixed block. The movable block is threadbly attached to the attaching piece. Further, the lock handle is coupled to the attaching piece to move the movable block slidingly over the fixed block.

In one embodiment of the present disclosure, the block member includes a first protruding arrangement to engage with the side recess. The first protruding arrangement includes a sliding rail block and a guiding chute. The sliding rail block is clamped on the fixed block and slidingly attached to the attaching piece via groove. The sliding rail block includes a guiding protrusion extending therefrom. Further, the guiding chute is formed on the movable block and faces towards the fixed block. The guiding chute is formed such that the guiding chute extends taperedly from center to side of the movable block. The guiding protrusion slidingly engaged with the guiding chute such that when the movable block is slid, the guiding protrusion moves in the guiding chute from the center to the side of the movable block to move out from the fixed block and engage with the side recess.

In one another embodiment of the present disclosure, the block member includes a second protruding arrangement to engage with the top recess. The second protruding arrangement includes an inclined top block, a guide block, and a stopper. The inclined top block is installed on the fixed block. The inclined top block includes a guiding slope. Further, the guide block is formed on the movable block. The guide block includes a complementary guiding slope sloped downwardly from side-to-center of the movable block. Furthermore, the stopper is arranged on the on the fixed block to prevent the inclined top block from moving back and forth. The inclined top block slidingly engaged with the guiding slope via the guiding slope and the complementary guiding slope such that when the movable block is slid over the fixed block, the guide block moves towards the lock handle to enable the inclined top block to move out from the fixed block and engage with the top recess.

This together with the other aspects of the present disclosure, along with the various features of novelty that characterize the present disclosure, is pointed out with particularity in the claims annexed hereto and forms a part of the present disclosure. For a better understanding of the present disclosure, its operating advantages, and the specified object attained by its uses, reference should be made to the accompanying drawings and descriptive matter in which there are illustrated exemplary embodiments of the present disclosure.

BRIEF DESCRIPTION OF THE DRAWINGS

The advantages and features of the present disclosure will become better understood with reference to the following detailed description taken in conjunction with the accompanying drawing, in which.

Like reference numerals refer to like parts throughout the description of several views of the drawing.

DETAILED DESCRIPTION OF THE DISCLOSURE

The exemplary embodiments described herein detail for illustrative purposes are subject to many variations in implementation. The present disclosure provides a bicycle rack support device. It should be emphasized, however, that the present disclosure is not limited only to what is disclosed and extends to cover various alternation to the bicycle rack support device. It is understood that various omissions and substitutions of equivalents are contemplated as circumstances may suggest or render expedient, but these are intended to cover the application or Implementation without departing from the spirit or scope of the present disclosure.

The terms "a" and "an" herein do not denote a limitation of quantity, but rather denote the presence of at least one of the referenced items.

The terms "having", "comprising", "including", and variations thereof signify the presence of a component.

Figure 1:
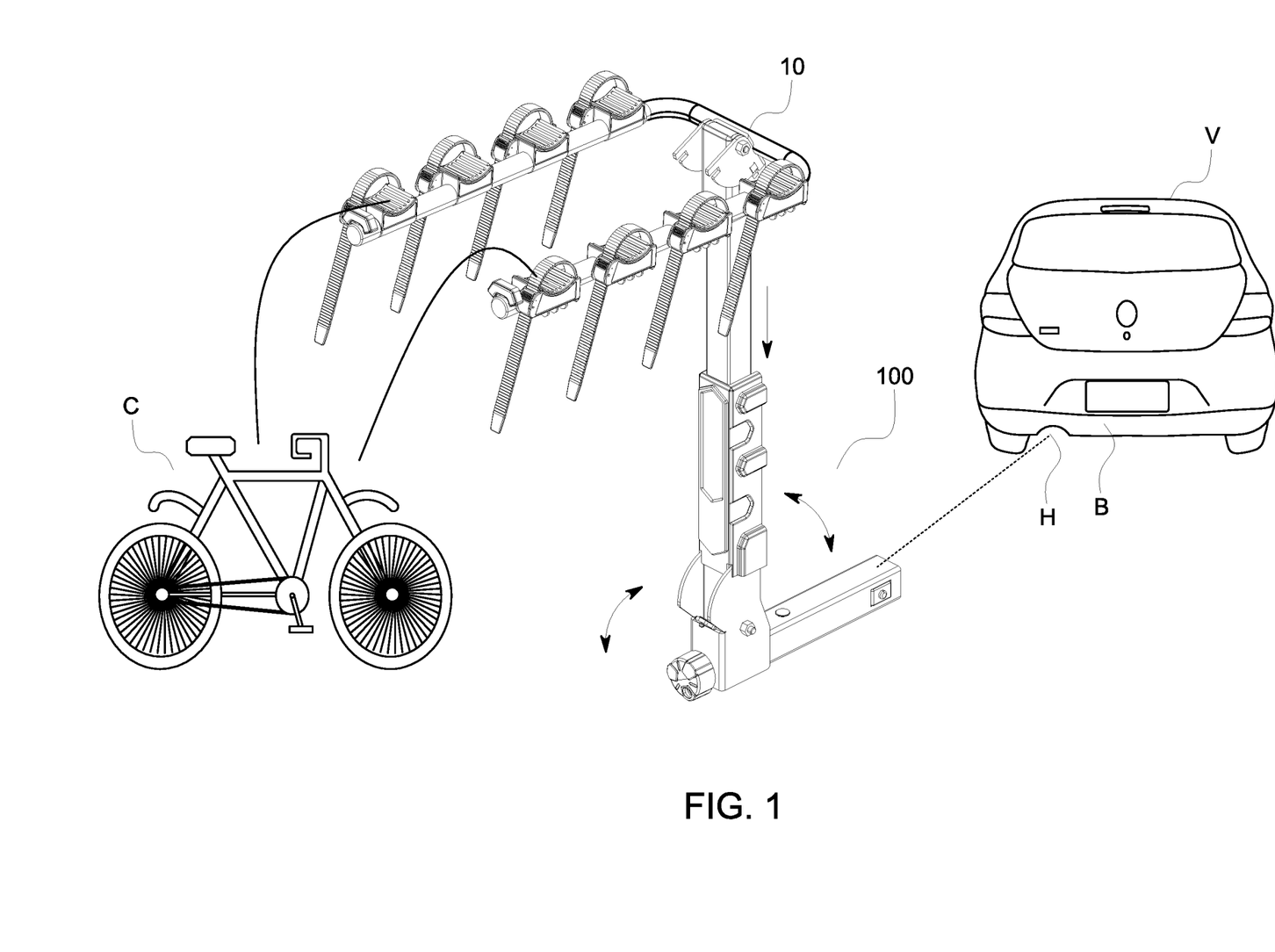
FIG. 1 illustrates an environment, whereby a bicycle rack support device is shown to be coupled with a vehicle to attach a bicycle rack for carrying a bicycle 'C' by the vehicle 'V', in accordance with an exemplary embodiment of the present disclosure.
Figure 2:
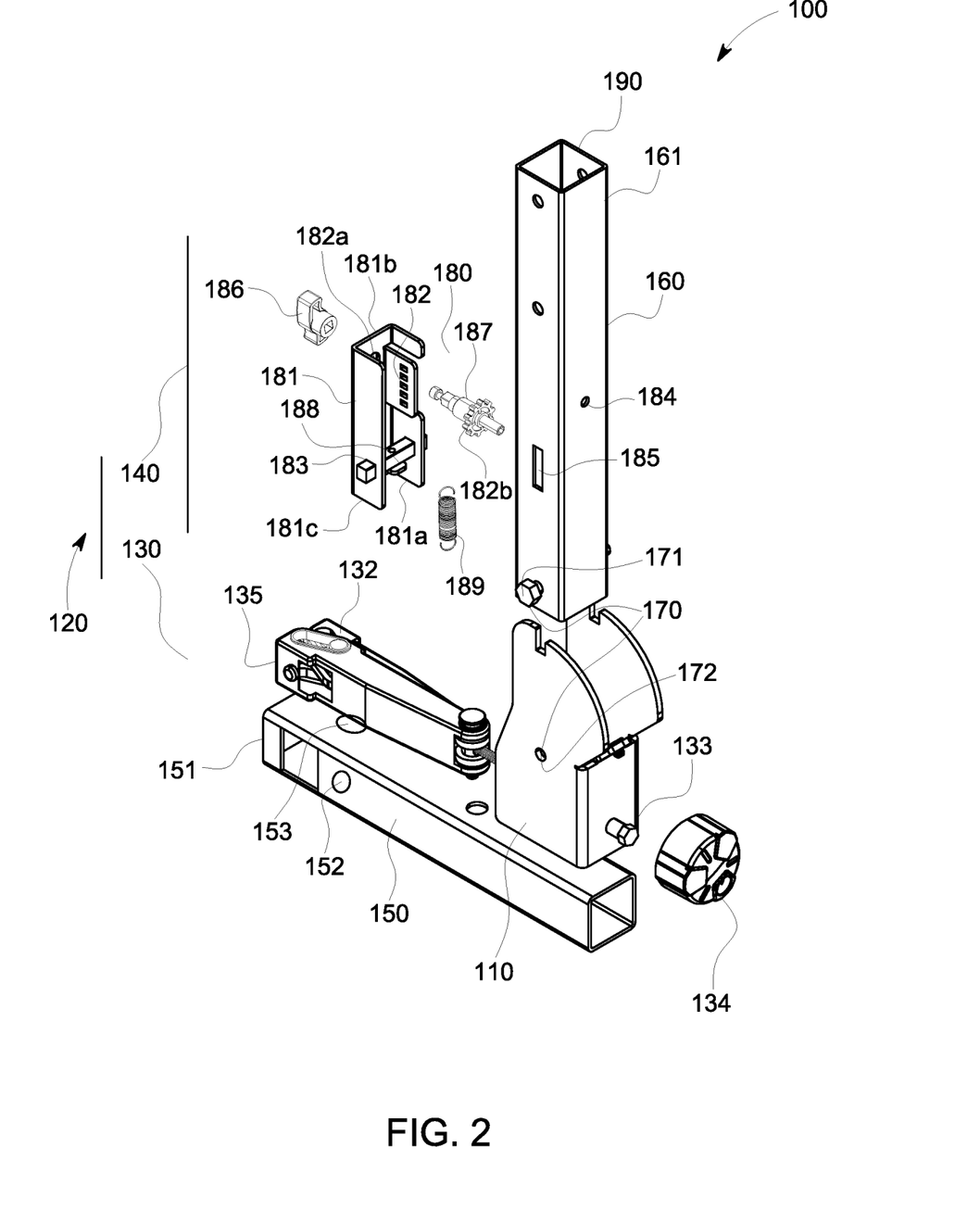
FIG. 2 illustrates an exploded view of a bicycle rack support device, in accordance with an exemplary embodiment of the present disclosure.
Figure 3:
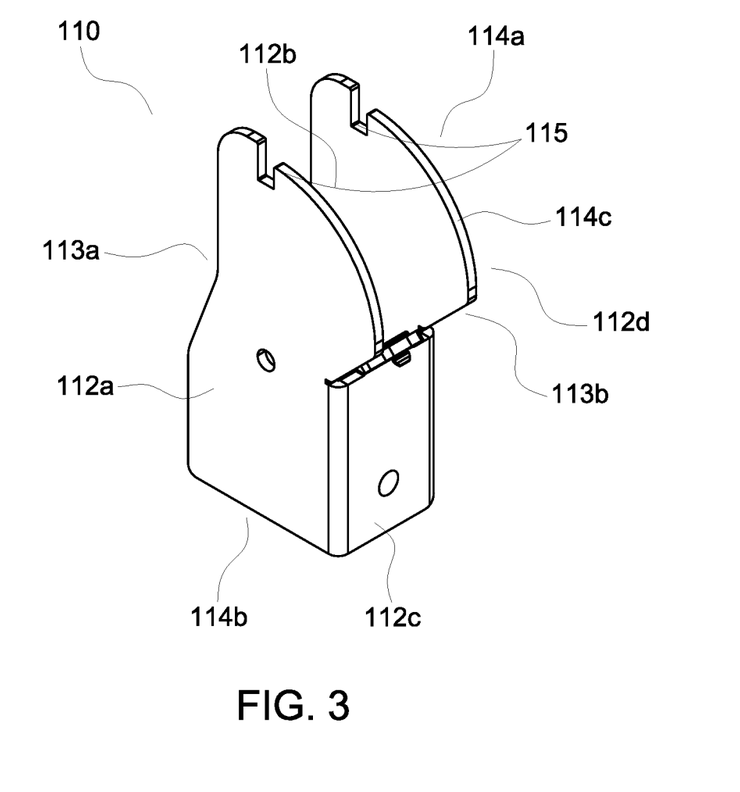
FIG. 3 illustrates a bracket of a bicycle rack support device of FIG. 2, in accordance with an exemplary embodiment of the present disclosure.
Figure 4A:
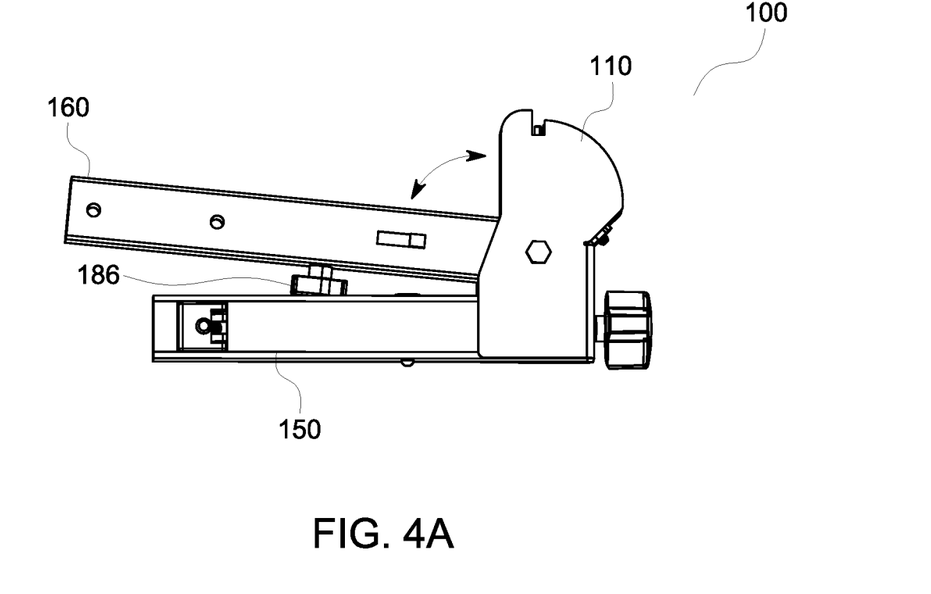
FIGS. 4A and 4B, respectively, illustrates a vertical support bar pivoted towards a horizontal support bar, and the vertical support bar pivoted away from the horizontal support bar, in accordance with an exemplary embodiment of the present disclosure.
Figure 4B:
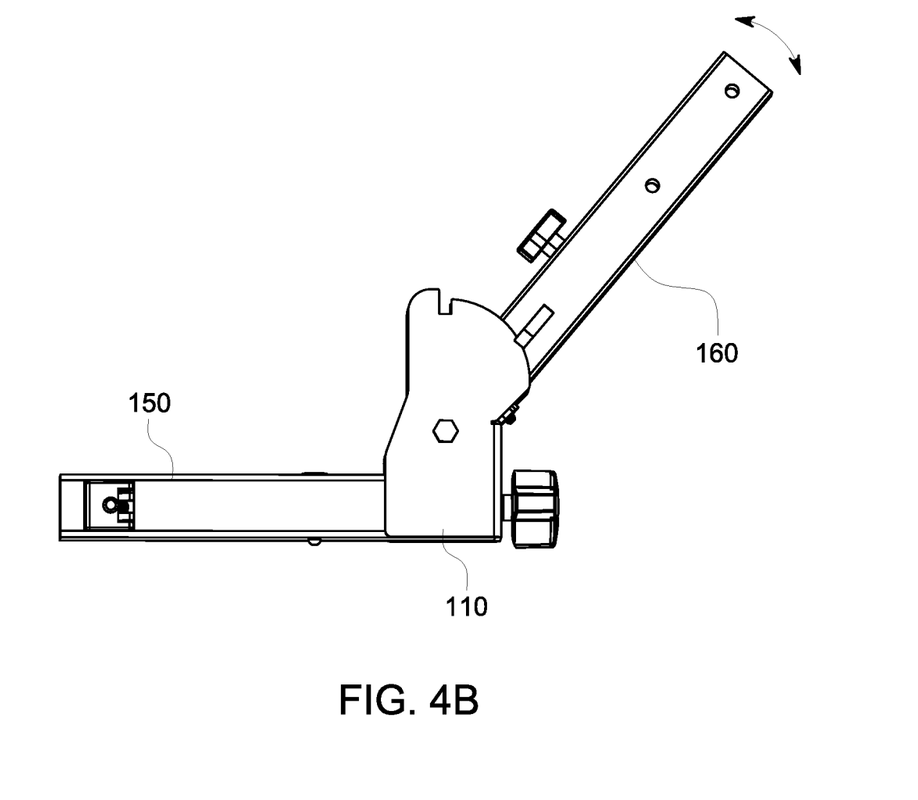
Figure 6A:
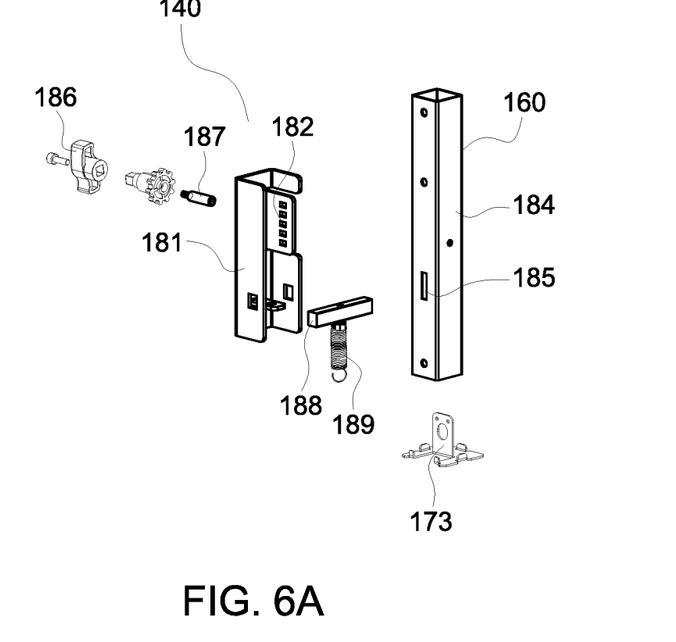
FIGS. 6A and 6B, respectively, illustrate an exploded and an assembled view of a second engagement member with a vertical support bar of a bicycle rack support device, in accordance with an exemplary embodiment of the present disclosure.
Figure 6B:
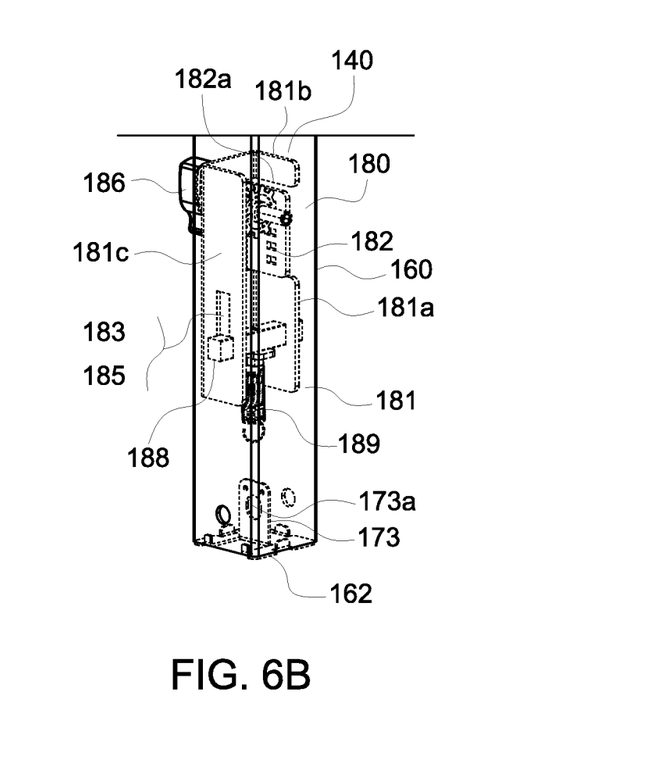
Figure 7A:
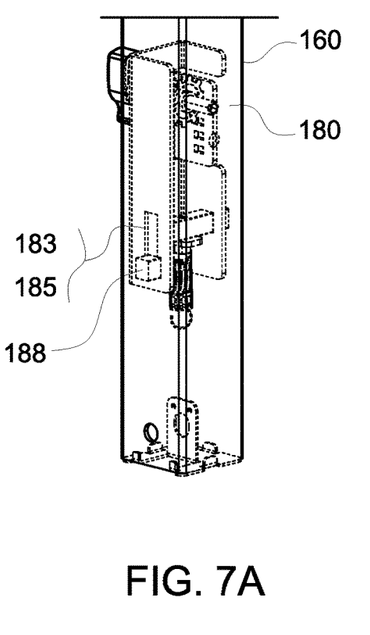
FIGS. 7A and 7B illustrate a pin member and first and second pin-receiving slots in an engaged state, in accordance with an exemplary embodiment of the present disclosure.
Figure 7B:
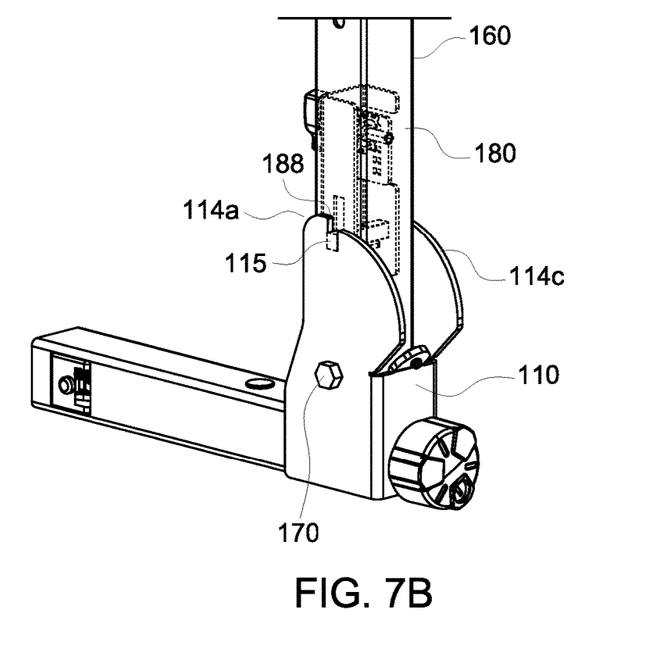
Figure 7C:
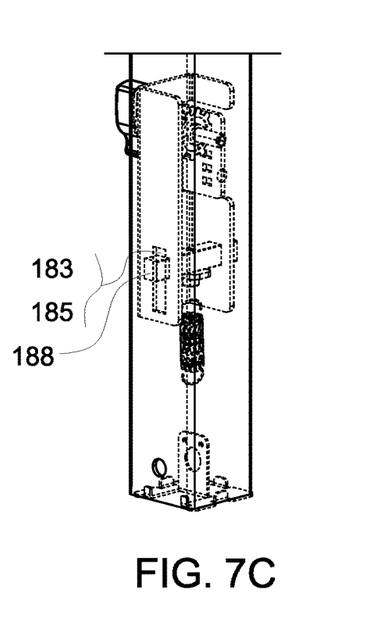
FIGS. 7C and 7D illustrate a pin member and first and second pin-receiving slots in a disengaged state to obtain a state as illustrated in FIGS. 4A and 4B, in which the vertical support bar pivot along the horizontal support bar, in accordance with an exemplary embodiment of the present disclosure.
Figure 7D:
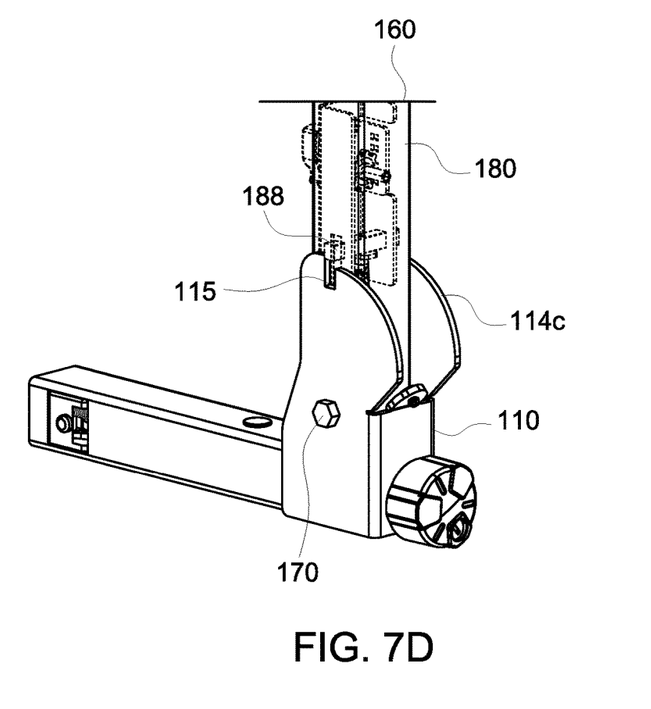

A bicycle rack support device 100 will now be described in conjunction with FIGS. 1 to 9C, in accordance with an exemplary embodiment of the present disclosure. FIG. 1 illustrates an environment, whereby the bicycle rack support device 100 is shown to be coupled with a vehicle 'V' to attach a bicycle rack 10 for carrying a bicycle 'C' by the vehicle 'V'. Referring now to FIGS. 2 to 4B, various views and components of the bicycle rack support device 100 are shown. For example, FIG. 2 illustrates an exploded view of the bicycle rack support device 100. FIG. 3 illustrates a bracket 120 of the bicycle rack support device 100. Further, FIGS. 4A and 4B, respectively, illustrates a vertical support bar 150 pivoted towards a horizontal support bar 160, and the vertical support bar 150 pivoted away from the horizontal support bar 160, in accordance with an exemplary embodiment of the present disclosure, and will now be described in conjunction to all the FIGS. 1 to 4B. Further, FIGS. 5A and 5B, respectively, illustrate an exploded and an assembled view of a first engagement member with a horizontal support bar of a bicycle rack support device; FIGS. 5C to 5F illustrate working of the first engagement member; FIGS. 6A and 6B, respectively, illustrate an exploded and an assembled view of a second engagement member with a vertical support bar of a bicycle rack support device; FIGS. 7A and 7B illustrate a pin member and first and second pin-receiving slots in an engaged state; FIGS. 7C and 7D illustrate a pin member and first and second pin-receiving slots in a disengaged state to obtain a state as illustrated in FIGS. 4A and 4B, in which the vertical support bar pivot along the horizontal support bar, in accordance with an exemplary embodiment of the present disclosure. Furthermore, FIGS. 8A to 8D illustrates working to a lock handle, in accordance with an exemplary embodiment of the present disclosure.

As seen in FIGS. 2, 3, 4A and 4B, the bicycle rack support device 100 includes a bracket 110, a collapsible latch assembly 120 having a first engagement member 130 and a second engagement member 140, a horizontal support bar 150, and a vertical support bar 160.

As seen particularly in FIG. 3, the bracket 110 includes two side plates 112a, 112b and a back plate 112c coupled together to form a front opened recess 113a extending across the bracket 112, and a partially back opened recess 113b extending along a top portion 114a aligned above a bottom portion 114b of the bracket 110. The two side plates 112a includes a circular tapered projection 114c, and a pair of fixing slots 115 along the top portion 114a.

Referring back to particularly FIG. 2 described in conjunction to FIGS. 3 and 4A-4B, and to FIGS. 5A to 7D, the first engagement member 130 of the collapsible latch assembly 120 is operatively engaged along the bottom portion 114b of the bracket 110. The second engagement member 140 of the collapsible latch assembly 120 is operatively engaged along the top portion 114b of the bracket 110. Furthermore, the horizontal support bar 150 is detachably coupled to the bracket 110 along the bottom portion 114b. The horizontal support bar 150 receives and is engaged with the first engagement member 130. The horizontal support bar 150 is adapted to be engaged with a hitch 'H' located beneath a bump 'B' of the vehicle 'V', as seen in FIG. 1. Moreover, the vertical support bar 160 is pivotally coupled to the bracket 110 along the top portion 114a above the horizontal support bar 150. The vertical support bar 160 is adapted to engage the bicycle rack 10. The vertical support bar 160 is operatively coupled with the second engagement member 140 to be engaged with the pair of fixing slots 115 to be fixed vertically, thereby vertically align the bicycle rack 10, as seen in FIG. 1.

The vertical support bar 160 may be pivoted along the circular tapered projection 114c of the bracket 110 towards rearward from the partially back opened recess 113b away from the horizontal support bar 150 to angularly adjust the bicycle rack 10 with respect to the vehicle 'V', as seen in FIG. 4B. Such rearward pivot movement of the vertical support bar 160 provide convenience of opening a tail gate of the vehicle 'V' while the bicycle rack 10 is coupled to the vehicle 'V'.

The vertical support bar 160 may be pivoted forward from the front opened recess 113a towards the horizontal support bar 150 via the second engagement member 140, as seen in FIG. 4B.

In one embodiment of the present disclosure, as seen in FIG. 2, each of the two side plates 112a, 112b along the top portion 114a of the bracket 112 includes a tapered part 112d to define the circular tapered projection 114c along the top portion 112a. The back opened recess 113b may extend towards the circular tapered projection 114c.

Figure 5A:
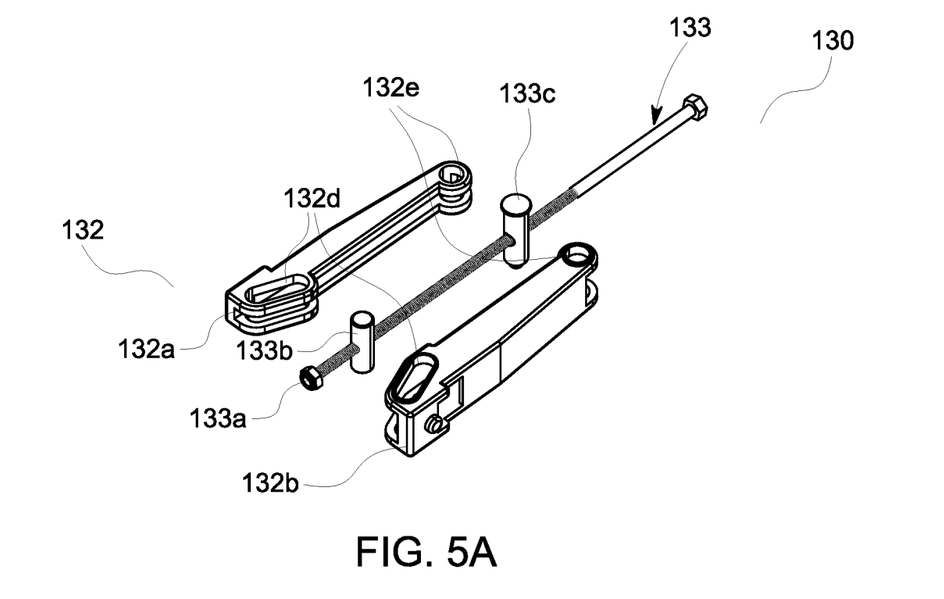
FIGS. 5A and 5B, respectively, illustrate an exploded and an assembled view of a first engagement member with a horizontal support bar of a bicycle rack support device, in accordance with an exemplary embodiment of the present disclosure.
Figure 5B:
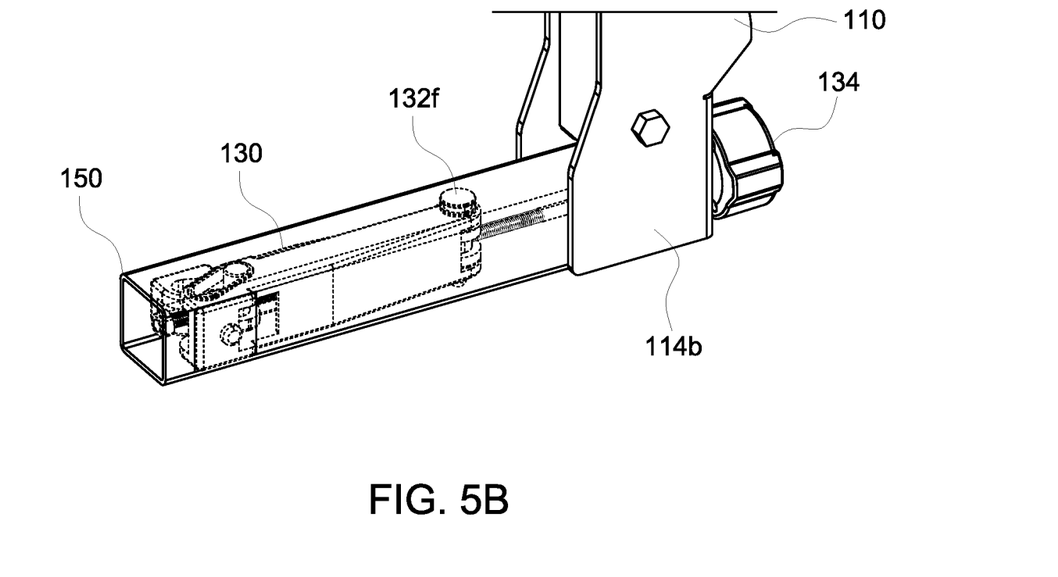

In one embodiment of the present disclosure, as seen in FIG. 2 and FIGS. 5A-5F, the first engagement member 130 is operatively engaged along the bottom portion 114b of the bracket 110 and disposed within the horizontal support bar 150, which is hollow. As specifically seen in FIGS. 5A and 5B, the first engagement member 130 includes an engageable attachment 132 and a lock handle 134. The engageable attachment 132 may include first and second supporting plates 132a, 132b, an attaching piece 133, an expansion bold 133a, a stud member 133b, and a fixed axis support point member 133c. The attaching piece 133 may incorporates the expansion bold 133a, the stud member 133b, and the fixed axis support point member 133c there-along. In one embodiment, the attaching piece 133 may threadably incorporates the expansion bold 133a, the stud member 133b, and the fixed axis support point member 133c therealong. The attaching piece 133 along with the expansion bold 133a, the fixed axis support point member 133b, and the stud member 133c is received between and extend beyond the first and second supporting plates 132a, 132b. Further, the first and second supporting plates 132a, 132b, each including slots 132d, at respective ends, moveably receive the stud member 133b; and including slots 132e, at respective opposite ends, to fixedly receive the fixed axis support point member 133c, when both the first and second supporting plates 132a, 132b align with each other. The engageable attachment 132 is disposed in the horizontal support bar 150 to be coupled therewithin via the fixed axis support point member 133c and extends to couple with the back plate 112c along the bottom portion 114b via the attaching piece 133. The fixed axis support point member 133c fixedly couple the first and second supporting plates 132a, 132b to the horizontal support bar 150 along a point called herein as a fixed axis support point 132f, as seen in FIG. 5B.

Figures 5C, 5D:
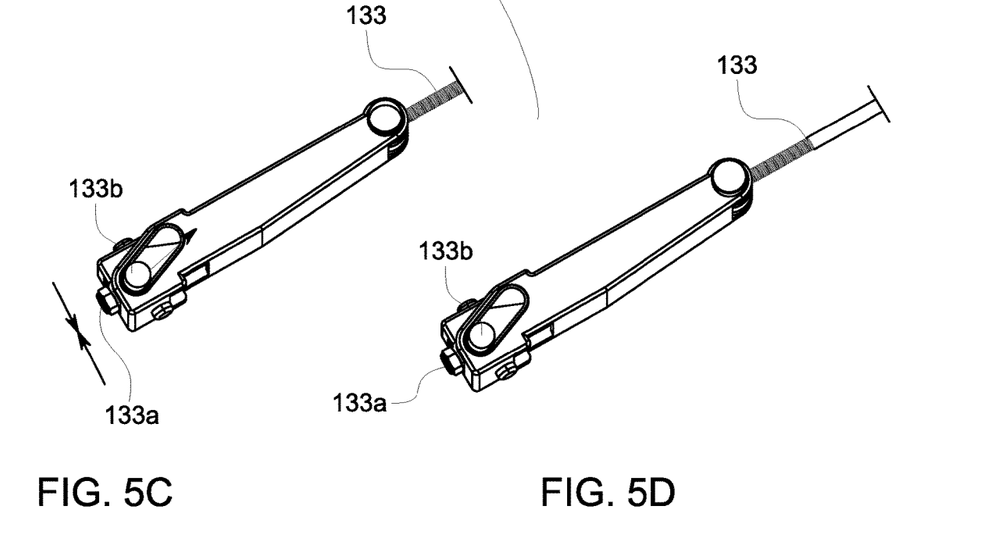
FIGS. 5C to 5F illustrate working of the first engagement member, in accordance with an exemplary embodiment of the present disclosure.
Figures 5E, 5F:
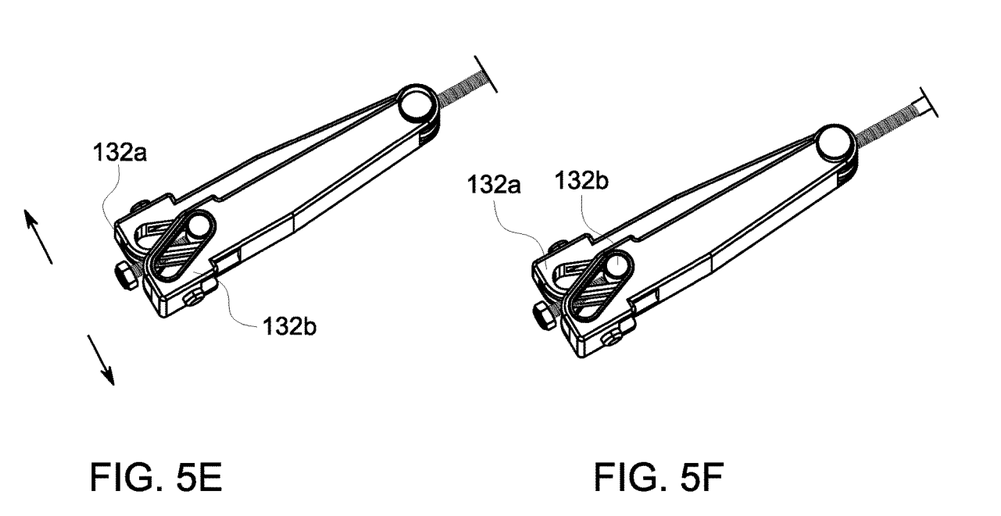

Further, the lock handle 134 is coupled to the attaching piece 133 to actuate the engageable attachment 132 to lock and unlock with the hitch 'H' of the vehicle 'V'. As can now be specifically seen in FIGS. 5C to 5F, when the lock handle 134 (seen in FIG. 5B) is rotated to be unlocked, the attaching piece 133 is also rotated, which in turns also rotates the expansion bold 133a to push back the stud member 133b, as seen in FIG. 5C (indicated by arrow), to move the first and second supporting plates 132a, 132b away from each other to expand, as seen in FIGS. 5E and 5F (indicated by arrow) from the non-expanded stated, as seen in FIGS. 5C and 5D to form a gap to access the expansion bold 133a by the hitch 'H' of the vehicle 'V'.

In one embodiment, as described, due to such expansion of the first and second supporting plates 132a, 132b, the bicycle rack support device 100 may be coupled to the hitch 'H' of the vehicle 'V' via engaging the expansion bold 133a to the hitch 'H', due to the gap formed between the first and second supporting plates 132a, 132b. In one another embodiment of the present disclosure, as seen in FIG. 2, the engageable attachment 132 includes a hitch attaching member 135 aligned across a free end portion 151 of the horizontal support bar 150. The hitch attaching member 135 is adapted to be attached with the hitch 'H' of the vehicle 'V', thereby attaching the bicycle rack support device 100 with the vehicle 'V'.

Figure 9A:
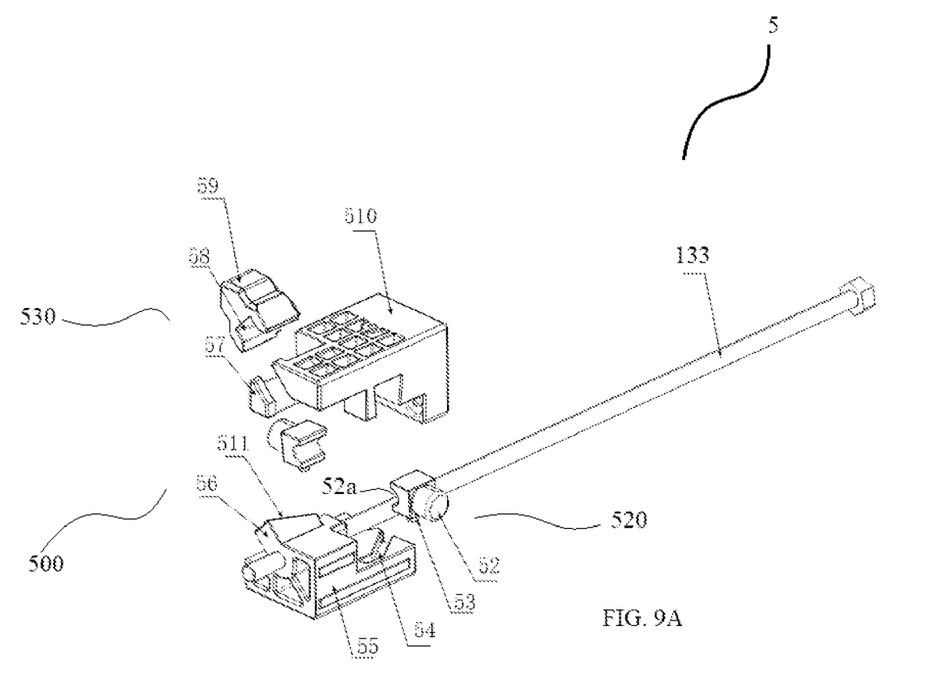
FIG. 9A illustrates an exploded view of another type of the first engagement member, in accordance with an exemplary embodiment of the present disclosure.
Figure 9B:
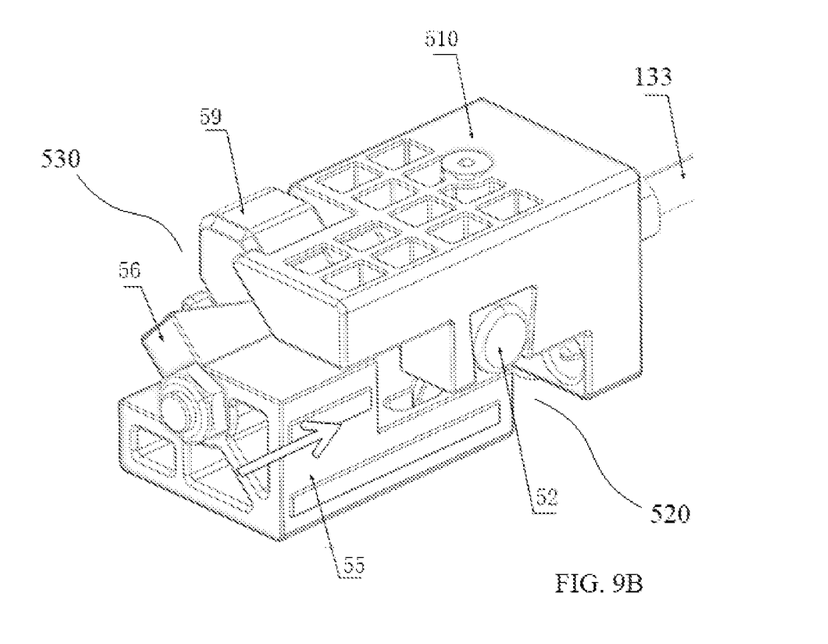
FIGS. 9B and 9C illustrate assembled view of the first engagement member of FIG. 9A, depicting working thereof, in accordance with an exemplary embodiment of the present disclosure.
Figure 9C:
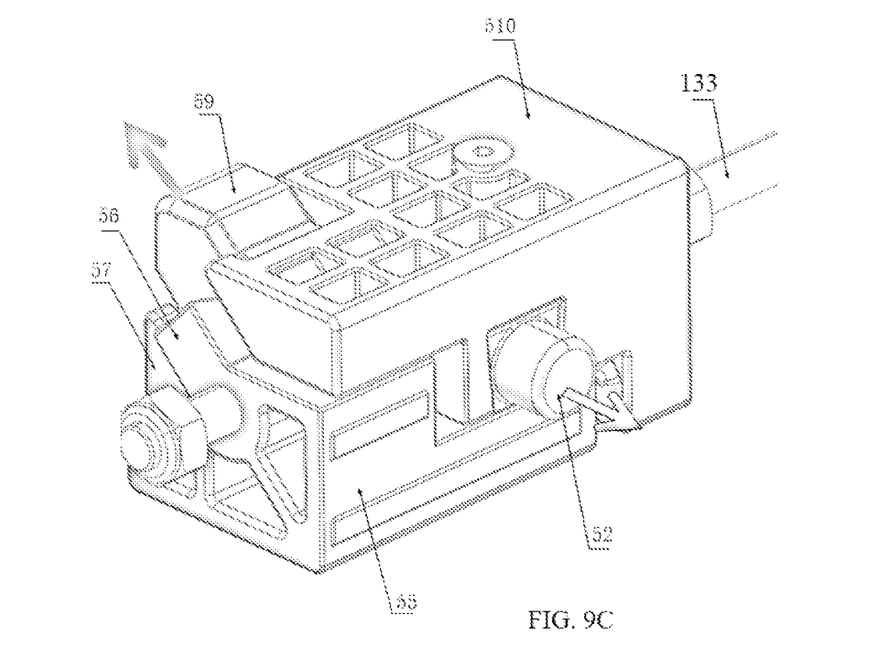

In one another embodiment, as seen in FIGS. 9A, 9B and 9C, another type of the first engagement member, such as a first engagement member 5 is illustrated. The first engagement member 5 is operatively engaged along the bottom portion 114b of the bracket 110 and disposed within the horizontal support bar 150 which is hollow and includes a side recess 152 and a top recess 153. The first engagement member 5 includes a block member 500 and a lock handle 134. The block member 500 is disposed within the hollow horizontal support bar 150 to be engaged with the side 152 and top 153 recesses. The block member includes a fixed block 510, and a movable block 55 slidingly engaged with the fixed block 510. The movable block 55 is threadbly attached to the attaching piece 133. Further, the lock handle 134 is coupled to the attaching piece 133 to move the movable block 55 slidingly over the fixed block 510.

In one embodiment of the present disclosure, as seen specifically in exploded view of FIG. 9A, the block member 500 includes a first protruding arrangement 520 to engage with the side recess 152. The first protruding arrangement 520 includes a sliding rail block 52 and a guiding chute 54. The sliding rail block 52 is clamped on the fixed block 510 and slidingly attached to the attaching piece 133 via groove 52a. The sliding rail block 52 includes a guiding protrusion 53 extending therefrom. Further, the guiding chute 54 is formed on the movable block 55 and faces towards the fixed block 510. The guiding chute 54 is formed such that the guiding chute 54 extends taperedly from center to side of the movable block 55. As seen in FIGS. 9B and 9C, the guiding protrusion 53 slidingly engaged with the guiding chute 54 such that when the movable block 55 is slid, the guiding protrusion 53 moves in the guiding chute 54 from the center to the side of the movable block 55 to move out from the fixed block 510 and engage with the side recess 152.

In one another embodiment of the present disclosure, as seen in FIG. 9A, the block member 500 includes a second protruding arrangement 530 to engage with the top recess 153. The second protruding arrangement 530 includes an inclined top block 59, a guide block 56, and a stopper 57. The inclined top block 59 is installed on the fixed block 510. The inclined top block 59 includes a guiding slope 58. Further, the guide block 56 is formed on the movable block 55. The guide block includes a complementary guiding slope 511 sloped downwardly from side-to-center of the movable block 55. Furthermore, the stopper 57 is arranged on the on the fixed block 510 to prevent the inclined top block 59 from moving back and forth. As seen in FIGS. 9B and 9C, the inclined top block 59 slidingly engaged with the guiding slope 58 via the guiding slope 58 and the complementary guiding slope 511 such that when the movable block 55 is slid over the fixed block 510, the guide block 56 moves towards the lock handle 134 to enable the inclined top block 59 to move out from the fixed block 510 and engage with the top recess 153.

Figure 8A:
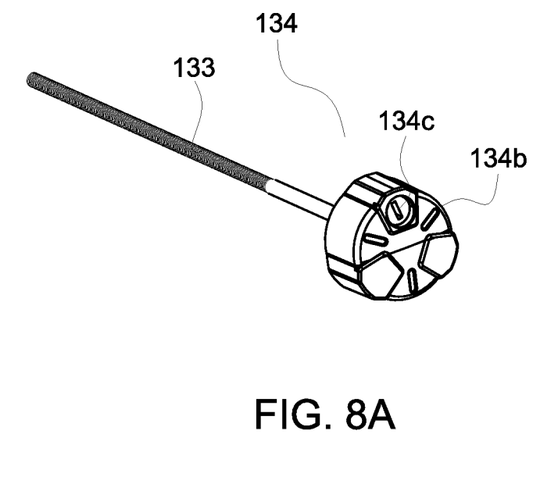
FIGS. 8A to 8D illustrates working to a lock handle, in accordance with an exemplary embodiment of the present disclosure.
Figure 8B:
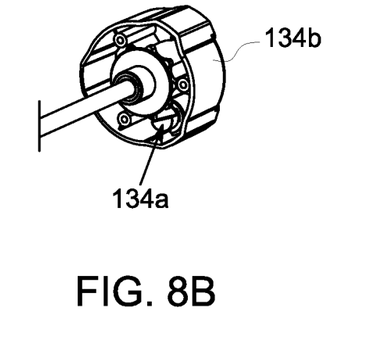
Figure 8C:
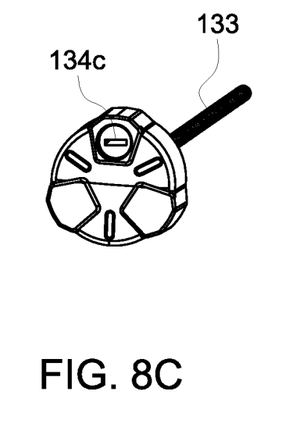
Figure 8D:
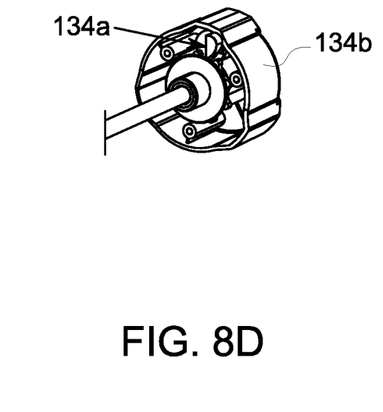

Referring now to FIGS. 8A to 8D, various embodiments of the lock handle 134 are illustrated, in accordance with an exemplary embodiment of the present disclosure. In one embodiment, the lock handle 134 may be a screw and lock type of locks. As the name suggest, the lock handle 134 may include a lock cylinder 134a and a handle 134b operatively coupled on the lock cylinder 134a. The lock cylinder 134a includes a key receiver 134c to receive a key to turn the key reviver 134c in a horizontal straight line, as seen in FIG. 8C (or FIG. 8B). At such position, when the handle 134b is rotated, it does not rotate the attaching piece 133 or the expansion bold 133a to push back the stud member 133b, and thus theft of such bicycle rack support device 100 may be avoided when not in use. Further, as seen in FIG. 8A (or FIG. 8D), when the lock cylinder 134a including the key receiver 134c is turned by the key to turn the key reviver 134c in a vertical straight line, the attaching piece 133 or the expansion bold 133a can now be rotated to push back the stud member 133b for working thereof.

In one embodiment of the present disclosure, as shown and described in conjunction to FIGS. 2, 4A-4B, 6A-6B, 7A-7B and 7C-7D, the second engagement member 140 is operatively engaged along the top portion 114b of the bracket 110 and disposed within the vertical support bar 160, which is hollow. The second engagement member 140 includes a pivotal attachment 170 and a gear-driven pin lock assembly 180. The pivotal attachment 170, as seen in FIG. 2, includes a pivoting pin 171 on the vertical support bar 160, and pivoting slots 172 on the two side plates 112a, 112b to receive the pivotal attachment 170 to be pivot therealong. The pivotal attachment 170, as seen in FIG. 6B, further includes an attaching member 173 extending upwardly from a bottom portion 162 and within the vertical support bar 160, and that such attaching member 173 includes recess 173a that colinearly align with the pivoting slots 172 to receive the pivoting pin 171 for establishing the pivotal attachment 170 of the vertical support bar 160 with the bracket 110.

Further, the gear-driven pin lock assembly 180 is operatively disposed in the vertical support bar 160 to enable pivoting of the vertical support bar 160 along the pivotal attachment 170 to angularly adjust the bicycle rack 10 with respect to the vehicle 'V'.

In one embodiment of the present disclosure, as seen in FIGS. 2 and 6A-6B, the gear-driven pin lock assembly 180 includes a U-shaped slide block 181 having a plurality of teeth receiving slots 182 on one side 181a, a first recess 182a on a top side 181b, and a first pin-receiving slots 183 extending through both sides 181a, 181c. The gear-driven pin lock assembly 180 further includes a pair of second recess 184, a second pin-receiving slots 185, the locking cum adjusting pin 186, a gear wheel 187, a pin member 188 and a biasing member 189.

The pair of second recess 184 (only one can be seen in FIG. 2) is configured on the vertical support bar 160. Further, the second pin-receiving slots 185 is vertically extending along two sides of the vertical support bar 160. The gear wheel 187 is received in the first recess 182a to be engaged with the pair of second recess 184 and extends through the U-shaped slide block 182 to protrude outward from the vertical support bar 160 to receive the locking cum adjusting pin 186. The gear wheel 187 includes a plurality of teeth 182b to be rotatingly engaged with the plurality of teeth receiving slots 182.

Furthermore, the pin member 188 is received in the first and second pin-receiving slots 183, 185 to be operatively slid-up (as seen in FIGS. 7C and 7D) and slid-down (as seen in FIGS. 7A and 7B) in the pair of fixing slots 115 along the top portion 114a of the bracket 110 to be slid on the circular tapered projection 114c, when the gear wheel 187 is adjusted with the locking cum adjusting pin 186.

In one embodiment of the present disclosure, the vertical support bar 160 may be locked and unlocked along the horizontal support bar 140 to be obtain upright position and to obtain rotating position. For doing so, the locking cum adjusting pin 186 of the gear-driven pin lock assembly 180 provided on the vertical support bar 160 may be locked with the pair of fixing slots 115 along the top portion 114a of the bracket 110 to obtain the upright position. Further, FIGS. 4A and 4B illustrate unlocked and rotating stated of the vertical support bar 160 and the pair of fixing slots 115.

Further, the biasing member 189 is operatively coupled to the pin member 188 and engaged with the pivoting pin 171 of the pivotal attachment 170 to provide biasing support to the pin member 188, when the pin member 188 is slid-up and sild-down in the pair of fixing slots 115 along the top portion 114a of the bracket 110 based on rotation of the gear wheel 187 to slid the pin member 188 on the circular tapered projection 114c to angularly adjust the bicycle rack 10 with respect to the vehicle 'V'.

In one embodiment of the present disclosure, the bicycle rack support device further includes a bicycle rack engaging portion 190 formed along a free end portion 161 of the vertical support bar 160 to receive the bicycle rack 10 to be coupled thereto.

In one embodiment of the present disclosure, the bicycle rack support device 100 and the various components are made of metal, alloy or hard plastic, and further each such components as described above may include protective covering for protection from rust and moisture if the bicycle rack support device 100 is of metal.

The present disclosure is advantageous in overcoming the shortcomings of the conventional bicycle racks. For example, the bicycle rack may provide convenience of opening tail gates of vehicles while the bicycle racks are coupled to the vehicles. Further, the bicycle rack may protect from theft. Furthermore, the bicycle rack may be easy to assemble and disassemble with the hitch of the vehicle.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, and to thereby enable others skilled in the art to best utilize the present disclosure and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the spirit or scope of the present disclosure.

What is claimed is:

1. A bicycle rack support device 100 for a vehicle 'V' to attach a bicycle rack 10 for carrying a bicycle 'C' by the vehicle 'V', the bicycle rack support device 100 comprising:
   a bracket 110 including two side plates 112a, 112b and a back plate 112c coupled together to form a front opened recess 113a extending across the bracket 112, and a partially back opened recess 113b extending along a top portion 114a aligned above a bottom portion 114b of the bracket 110, wherein the two side plates 112a, 112b comprises a circular tapered projection 114c, and a pair of fixing slots 115 along the top portion 114a;
   a collapsible latch assembly 120 having:
      a first engagement member 130 operatively engaged along the bottom portion 114b of the bracket 110, and
      a second engagement member 140 operatively engaged along the top portion 114a of the bracket 110;
   a horizontal support bar 150 detachably coupled to the bracket 110 along the bottom portion 114b, wherein the horizontal support bar 150 engaged with the first engagement member 130, the horizontal support bar 150 adapted to be engaged with a hitch 'H' located beneath a bumper 'B' of the vehicle 'V' via the first engagement member 130;
   a vertical support bar 160 pivotally coupled to the bracket 110 along the top portion 114a above the horizontal support bar 150, the vertical support bar 160 adapted to engage the bicycle rack 10, the vertical support bar 160 operatively coupled with the second engagement member 140 to be:
      engaged with the pair of fixing slots 115 to be fixed vertically thereby vertically align the bicycle rack 10, and
      pivoted along the circular tapered projection 114c of the bracket 110 towards rearward from the partially back opened recess 113b away from the horizontal support bar 150 to angularly adjust the bicycle rack 10 with respect to the vehicle 'V'.

2. The bicycle rack support device 100 of claim 1, wherein each of the two side plates 112a, 112b along the top portion 114a of the bracket 112 comprises:
   a tapered part 112d to define the circular tapered projection 114c along the top portion 114a, wherein the back opened recess 113b extends towards the circular tapered projection 114c.

3. The bicycle rack support device 100 of claim 1, wherein the first engagement member 130 is operatively engaged along the bottom portion 114*b* of the bracket 110 and disposed within the horizontal support bar 150 which is hollow, the first engagement member 130 comprising:
- an engageable attachment 132 disposed in the horizontal support bar 150 and extends to couple with the back plate 112*c* along the bottom portion 114*b* of the bracket 110 via an attaching piece 133; and
- a lock handle 134 coupled to the attaching piece 133 to actuate the engageable attachment 132.

4. The bicycle rack support device 100 of claim 3, wherein the engageable attachment 132 comprises a hitch attaching member 135 aligned across a free end portion 151 of the horizontal support bar 150, the hitch attaching member 135 adapted to be attached with the hitch 'H' of the vehicle 'V', thereby attaching the bicycle rack support device 100 with the vehicle 'V'.

5. The bicycle rack support device 100 of claim 3, wherein the lock handle 134 is adapted to be pushed or pulled or rotated clockwise or anti-clockwise to actuate the engageable attachment 132.

6. The bicycle rack support device 100 of claim 1, wherein the engageable attachment 132 comprises:
- first and second supporting plates 132*a*, 132*b*, an attaching piece 133, an expansion bold 133*a*, a stud member 133*b*, and a fixed axis support point member 133*c*,
- wherein the attaching piece 133 threadably incorporates the expansion bold 133*a*, the stud member 133*b*, and the fixed axis support point member 133*c* there-along,
- wherein the attaching piece 133 along with the expansion bold 133*a*, the fixed axis support point member 133*b*, and the stud member 133*c* is received between and extends beyond the first and second supporting plates 132*a*, 132*b*, and
- wherein each of the first and second supporting plates 132*a*, 132*b* comprises slots 132*d*, at respective ends, to moveably receive the stud member 133*b*; and including another slots 132*e*, at respective opposite ends, to fixedly receive the fixed axis support point member 133*c*, when both the first and second supporting plates 132*a*, 132*b* align with each other.

7. The bicycle rack support device 100 of claim 1, wherein the second engagement member 140 operatively engaged along the top portion 114*a* of the bracket 110 and disposed within the vertical support bar 160 which is hollow and, wherein the second engagement member 140 comprises:
- a pivotal attachment 170 having a pivoting pin 171 on the vertical support bar 160, and pivoting slots 172 on the two side plates 112*a*, 112*b* to receive the pivotal attachment 170 to be pivot therealong; and
- a gear-driven pin lock assembly 180 operatively disposed in the vertical support bar 160 and operatively coupled to the pivotal attachment 170 to adjust the pivoting pin 171 to pivot the vertical support bar 160 to angularly adjust the bicycle rack 10 with respect to the vehicle 'V'.

8. The bicycle rack support device 100 of claim 7, wherein the gear-driven pin lock 180 structure comprises:
- a U-shaped slide block 181 having a plurality of teeth receiving slots 182 on one side 181*a*, a first recess 182*a* on a top side 181*b*, and a first pin-receiving slots 183 extending through both sides 181*a*, 181*c*;
- a pair of second recess 184 on the vertical support bar 160;
- a second pin-receiving slots 185 vertically extending along two sides of the vertical support bar 160;
- a locking cum adjusting pin 186;
- a gear wheel 187 engaged with the first recess 182*a* and the pair of second recess 184 and extends through the U-shaped slide block 182 to protrude outward from the vertical support bar 160 to receive the locking cum adjusting pin 186, the gear wheel 187 having a plurality of teeth 182*b* to be rotatingly engaged with the plurality of teeth receiving slots 182;
- a pin member 188 received in the first and second pin-receiving slots 183, 185 to be operatively slid up and down in the second pin-receiving slots 186 to be slid on the circular tapered projection 114*c*, when the gear wheel 187 is adjusted with the locking cum adjusting pin 186; and
- a biasing member 189 coupled to the pin member 188 and the pivoting pin 171 of the pivotal attachment 170 adjust the pivoting pin 171 based on rotation of the gear wheel 187 to slid the pin member 188 on the circular tapered projection 114*c* to angularly adjust the bicycle rack 10 with respect to the vehicle 'V'.

9. The bicycle rack support device 100 of claim 1, wherein the second engagement member 140 having a locking cum adjusting pin 186 to be locked with the first engagement member 130 on the horizontal support bar 140, when the bicycle rack 10 is not engaged with the vertical support bar 160.

10. The bicycle rack support device 100 of claim 1 further comprising a bicycle rack engaging portion 190 formed along a free end portion 161 of the vertical support bar 160.

11. The bicycle rack support device 100 of claim 1 is of metal or plastic.

12. The bicycle rack support device 100 of claim 1, wherein the first engagement member 5 is operatively engaged along the bottom portion 114*b* of the bracket 110 and disposed within the horizontal support bar 150 which is hollow and includes a side recess 152 and a top recess 153, the first engagement member 5 comprising:
- a block member 500 disposed within the hollow horizontal support bar 150 to be engaged with the side 152 and top 153 recesses, the block member having a fixed block 510, and a movable block 55 slidingly engaged with the fixed block 510, the movable block 55 is threadbly attached to the attaching piece 133; and
- a lock handle 134 coupled to the attaching piece 133 to move the movable block 55 slidingly over the fixed block 510.

13. The bicycle rack support device 100 of claim 12, wherein the block member 500 comprises a first protruding arrangement 520 to engage with the side recess 152, the first protruding arrangement 520 having:
- a sliding rail block 52 clamped on the fixed block 510 and slidingly attached to the attaching piece 133 via groove 52*a*, the sliding rail block 52 having a guiding protrusion 53 extending therefrom,
- a guiding chute 54 formed on the movable block 55 and faces towards the fixed block 510, the guiding chute 54 formed such that the guiding chute 54 extends taperedly from center to side of the movable block 55,
- wherein the guiding protrusion 53 slidingly engaged with the guiding chute 54 such that when the movable block 55 is slid, the guiding protrusion 53 moves in the guiding chute 54 from the center to the side of the movable block 55 to move out from the fixed block 510 and engage with the side recess 152.

14. The bicycle rack support device 100 of claim 12, wherein the block member 500 comprises a second protruding arrangement 530 to engage with the top recess 153, the second protruding arrangement 530 having:
- an inclined top block 59 installed on the fixed block 510, the inclined top block 59 having a guiding slope 58;
- a guide block 56 formed on the movable block 55, the guide block having a complementary guiding slope 511 sloped downwardly from side-to-center of the movable block 55; and
- a stopper 57 arranged on the on the fixed block 510 to prevent the inclined top block 59 from moving back and forth,
- wherein the inclined top block 59 slidingly engaged with the guiding slope 58 via the guiding slope 58 and the complementary guiding slope 511 such that when the movable block 55 is slid over the fixed block 510, the guide block 56 moves towards the lock handle 134 to enable the inclined top block 59 to move out from the fixed block 510 and engage with the top recess 153.

* * * * *